United States Patent [19]

Yoshida et al.

[11] Patent Number: 4,492,983

[45] Date of Patent: Jan. 8, 1985

[54] SYSTEM FOR DECODING COMPRESSED DATA

[75] Inventors: Shigeru Yoshida, Kawasaki; Minoru Koseki, Koshigaya; Masakatsu Horie, Atsugi, all of Japan

[73] Assignee: Fujitsu Limited, Kawasaki, Japan

[21] Appl. No.: 253,924

[22] PCT Filed: Aug. 15, 1980

[86] PCT No.: PCT/JP80/00185

§ 371 Date: Apr. 17, 1981

§ 102(e) Date: Apr. 17, 1981

[87] PCT Pub. No.: WO81/00659

PCT Pub. Date: Mar. 5, 1981

[30] Foreign Application Priority Data

Aug. 17, 1979 [JP] Japan ............................ 54-104635

[51] Int. Cl.³ .............................................. H04N 7/12
[52] U.S. Cl. .................................................. 358/260
[58] Field of Search ............................. 358/260, 261

[56] References Cited

U.S. PATENT DOCUMENTS 4,245,257 1/1981 Yamazaki et al. ................. 358/260

FOREIGN PATENT DOCUMENTS 52-58406 5/1977 Japan .
52-75111 6/1977 Japan .
54-44418 4/1979 Japan .
55-38729 3/1980 Japan .
55-46676 4/1980 Japan .

Primary Examiner—Joseph A. Orsino, Jr.
Attorney, Agent, or Firm—Staas & Halsey

[57] ABSTRACT

A system for decoding compressed data comprising an address memory of a FIFO type or RAM type, and an addition/subtraction circuit in which addition/subtraction is carried out between the address of a reference color change element and a relative distance between the reference color change element and a color change element in question, so that position data for the color change element in question is obtained, and the obtained position data of the color change element in question is written-in to the address memory.

3 Claims, 11 Drawing Figures

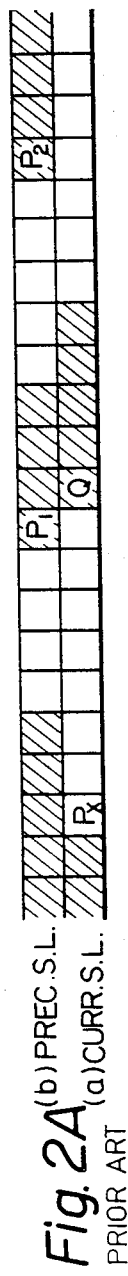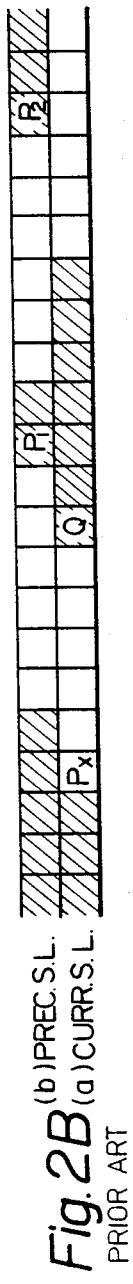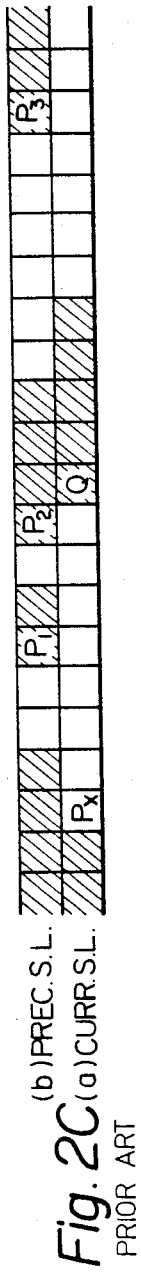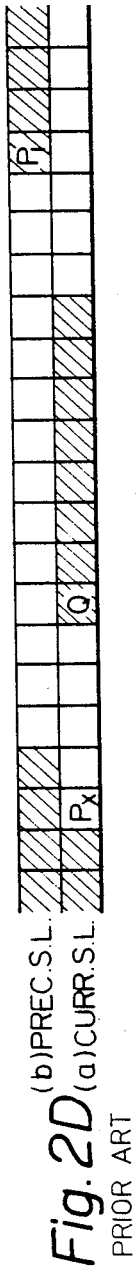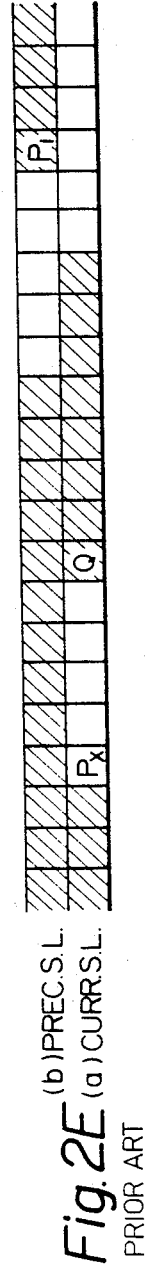
Fig. 2A PRIOR ART
Fig. 2B PRIOR ART
Fig. 2C PRIOR ART
Fig. 2D PRIOR ART
Fig. 2E PRIOR ART

SYSTEM FOR DECODING COMPRESSED DATA

BACKGROUND OF THE INVENTION (a) Field of the Invention

The present invention relates to a system for decoding compressed data. The system of the present invention is used for decoding compressed data of a facsimile data transmission.

(b) Background of the Prior Art

In general, data compression has been used for speeding up facsimile data transmission.

A prior art technique of coding and decoding compressed data using correlationship in data of adjacent scan lines is illustrated in FIGS. 1 and 2A through 2E. The prior art system for decoding compressed data is illustrated in FIG. 1. The system of FIG. 1 comprises a memory 1 for storing the compressed data, a circuit 2 for equalizing bit lengths of codes and a shift register 8 for a preceding scan line. The sytem also includes a circuit 46 for detecting color change elements, a circuit 47 for generating shift pulses and a circuit 48 for counting addresses on the preceding scan line a. Additionally included is a circuit 64 for addition/substraction and a circuit 65 for addition. The systems further includes a memory 76 for the address of a color change element in question, a circuit 72 for restoring the picture elements for a current scan line, a circuit 74 for counting addresses on the current scan line, a device 73 for reproducing the picture and a memory 75 for a current scan line. The circuit 2 for equalizing the bit lengths of codes produces data D3 for the selection of a reference correlated color change element, data D11 for a relative distance between the reference correlated color change element and the color change element in question or needed and data D12 for a distance between the last preceding color change element and the independent color change element in question.

The procedures which are carried out by the system of FIG. 1 will be explained with reference to color element patterns of pictures illustrated in FIGS. 2A through 2E. In FIGS. 2A through 2E patterns of the pictures along the current scan line (a) and the preceding scan line (b) are illustrated. Line scans are carried out horizontally from the left side to the right side, while line-by-line scans are carried out vertically from the top side to the bottom side. Hatched picture elements represent black elements, while non-hatched picture elements represent white elements. $P_1$, $P_2$, $P_3$, $P_x$ and Q are the color change elements. Color changes from white to black at $P_1$, $P_2$, $P_3$ and Q, while color changes from black to white at $P_x$. The nature of these color change elements are as follows.

(1) Q is the color change element in question or needed color change element on the current scan line.

(2) $P_x$ is the last preceding color change element on the current scan line with respect to Q.

(3) $P_1$ is a color change element on the preceding scan line the type of which color change is the same as that of the type of color change of the color change element in question. In FIGS. 2A through 2E, for example, the color changes from white to black both at Q and $P_1$.

(4) $P_2$ is the next color change element on the preceding scan line the type of which color change is the same as that of the color change of $P_1$.

There are two kinds of color change elements in question Q in FIGS. 2A through 2E. That is, the color change elements Q in FIGS. 2A, 2B and 2C are "correlated" color change elements, while the color change elements Q in FIGS. 2D and 2E are "independent" color change elements.

The difference between a correlated color change element and an independent color change element is as follows. That is, if there is a run of picture elements, i.e. the continuous sequence of picture elements, which have the same color as the color of the color change element in question on the current scan line, existing on the preceding scan line which overlaps the run of picture elements starting with the color change element in question on the current scan line and does not overlap the immediately preceding run of picture elements, which have the same color as the color of the color change element in question, existing on the current scan line, such color change element in question is called a "correlated" color change element. While, if there is a run of picture elements, which have the same color as the color of the color change element in question on the current scan line, on existing the preceding scan line which does not overlap the run of picture elements starting with the color change element in question on the current scan line, or if there is a run of picture elements on the preceding scan line, which have the same color as the color of the color change element in question on the current scan line which overlaps both the run of picture elements starting with the color change element in question and the preceding run of picture elements which have the same color as the color of the color change element in question on the current scan line, such a color change element in question is called an "independent" color change element.

The address of a color change element in question is determined by the address of the reference color change element and the distance between the reference color change element and the color change element in question.

In FIGS. 2A, 2B and 2C, the address data for the color change element Q in question are as follows.

For Q of FIG. 2A ... (1, +1)
For Q of FIG. 2B ... (1, −2)
For Q of FIG. 2C ... (2, −1)

The first numerals "1", "1" and "2" in the parentheses are position data and indicate that the reference color change elements on the preceding scan line are $P_1$ (FIG. 2A), $P_1$ (FIG. 2B) and $P_2$ (FIG. 2C), respectively. The second numerals "+1", "−2" and "+1" in the parentheses indicate that the relative displacement of the color change element in question from the reference color change element are one picture element to the right (FIG. 2A), two picture element to the left (FIG. 2B) and one picture element to the right (FIG. 2C), respectively.

In FIGS. 2D and 2E, the address data for the color change element Q in question are determined by the address of the reference color change element $P_X$ and the distance between the reference color change element $P_X$ and the color change element Q in the question. The adjacent preceding color change element on the current scan line is selected as the reference color change element for the independent color change element Q in question as illustrated in FIGS. 2D and 2E. If no preceding color change element exists on the current scan line, the first picture element on the current scan line is selected as the reference color change element.

The prior art technique of decoding compressed data on the basis of the patterns illustrated in FIGS. 2A through 2E is carried out by the prior art system for decoding compressed data illustrated in FIG. 1. Data for the preceding scan line stored in the shift register 8 are shifted by the shift pulses supplied from the circuit 47 for generating shift pulses. Addresses of color change elements are counted by the circuit 48 for counting addresses on the preceding scan line. Circuit 48 receives signals from the circuit 47 for generating shift pulses which receives signals from the circuit 46 for detecting color change elements. Data for the correlated color change element in question is calculated in the circuit 64 for addition/subtraction, which circuit 64 receives the data from the circuit 48 and the data D11 from the circuit 2, and stored in the resister 76 for the address of a color change element in question. The data of an independent color change element in question is calculated in the circuit 65 for addition, which circuit 65 receives the data from the circuit 74 for counting addresses on the current scan line and the data D12 from the circuit 2, and stored in the register 76. The data stored in the register 76 is written into the circuit 72 for restoring the data for picture elements for a current scan line. The data for picture elements in the circuit 72 is supplied to and stored in the memory 75 for a current scan line. The data for picture elements stored in the memory 75 for a current scan line is transmitted to the shift register 8 as the data for the picture elements of the next preceding scan line.

However, in the prior art system of FIG. 1, a predetermined length of time is always required for shifting the data for all of the picture elements of a preceding scan line because the shift register 8 stores the data for all of the picture elements of a preceding scan line. Also, the prior art system of FIG. 1 requires shift circuits and counter circuits for the shift register 8. Accordingly, the prior art system of FIG. 1 is disadvantageous because a high speed decoding operation cannot be attained and the construction of the devices of the system is complicated.

The above described prior art system is disclosed in, for example, Japanese Patent Application Laid-open No. 52-58406.

The present invention is directed to obviating the above described disadvantage in the prior art system.

SUMMARY

It is an object of the present invention to speed up the conventional operation of decoding compressed data for a picture by using a device having a relatively simple structure.

According to the present invention there is provided a system for decoding compressed data in which data for a color change element in question comprises an address of a reference color change element either on a preceding scan line or on a current scan line, and a relative distance between said color change element in question and said reference color change element. Said system comprises an address memory, whereby data for decoded color change elements are stored in the address memory which is capable of storing position data of the entire color change elements on at least two successive scan lines. The reference color change element is selected from the decoded data for the color change elements, addition/substraction is carried out between the address of said reference color change element, and the relative distance between said reference color change element and the color change element in question, so that position data for the color change element in question is obtained, and said obtained position data for the color change element is written-in to said address memory.

BRIEF DESCRIPTION OF THE DRAWINGS

FIGS. 2A through 2E illustrate patterns of picture elements along a scan line used for the system of FIG. 1;

DESCRIPTION OF THE PREFERRED EMBODIMENTS

Figure 1:
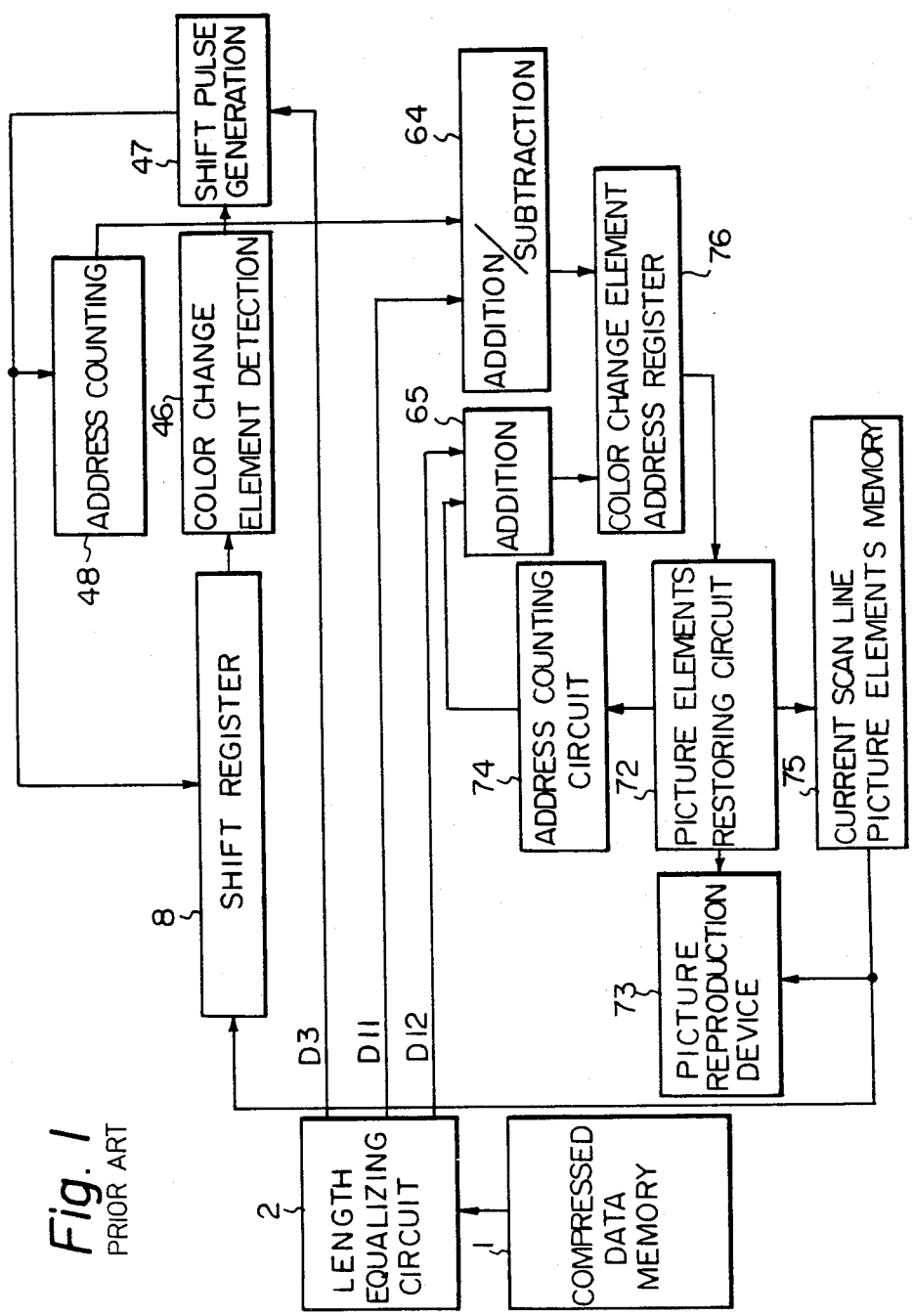
FIG. 1 illustrates a prior art system for decoding compressed data.
Figure 3:
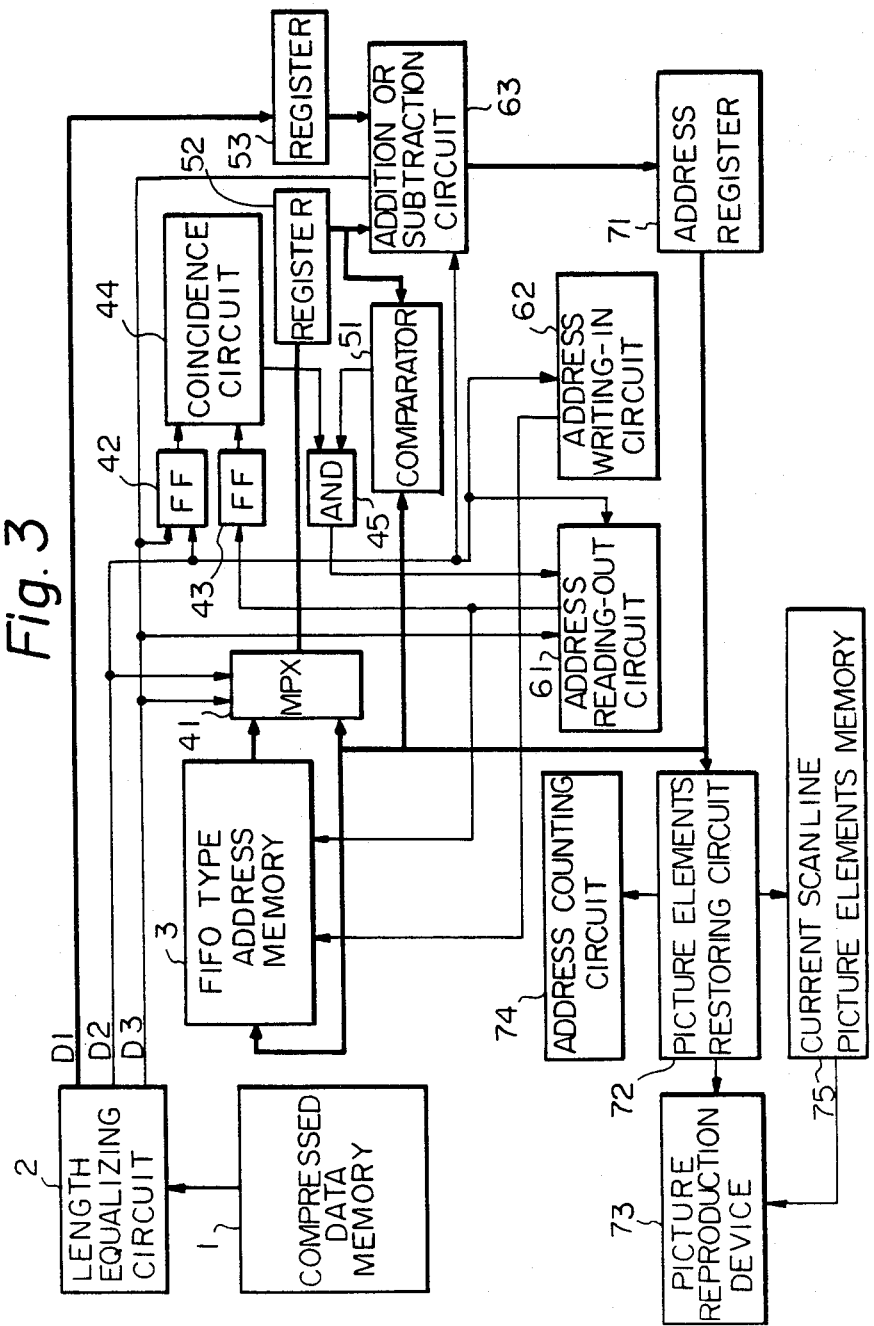
FIG. 3 illustrates a system for decoding compressed data in accordance with an embodiment of the present invention.

A system for decoding compressed data in accordance with an embodiment of the present invention is illustrated in FIG. 3. The system of FIG. 3 is of a relative address coding (RAC) type. The system of FIG. 3 comprises an address memory 3 of a "first in first out" (FIFO) type. The system of FIG. 3 also comprises a multiplex circuit 41, flip-flop circuits 42 and 43, a coincidence circuit 44 and an AND gate 45. The system also includes a comparator 51 and registers 52 and 53; an addition/subtraction circuit 63, an address reading-out circuit 61 and an address writing-in circuit 62. Additionally included is an address register 71, a picture elements restoring circuit 72, a picture reproduction device 73, an address counting circuit 74 and a current scan line picture elements memory 75. Reading-out an address of a color change element on the preceding scan line is effected by the address reading-out circuit 61, and writing-in of a color change element on the current scan line is effected by the address writing-in circuit 62.

Compressed data stored in a compressed data memory 1 are supplied to a length equalizing circuit 2. In the length equalizing circuit 2, a determination as to whether the color change element in question or the needed color change element is a correlated color change element or an independent color change element and equalization of the length of the data for the distance between the reference color change element and the color change element in question are effected. In this equalization, the run length codes having different bit lengths are converted into the corresponding binary codes having the same bit length.

The length equalizing circuit 2 produces the data D1 which represents the distance between the color change element in question or the needed color change element and the reference color change element, the data D2 which represents data for independent color change elements and the data D3 which represents the data for correlated color change elements. The data D2 and D3 are supplied to the flip-flop circuit 42 to change an output signal which indicates whether the color change element in question is white or black. The data D1 is stored in the register 53. Also the data D2 and D3 are supplied to the multiplexer 41.

When the multiplexer 41 receives the data D2 from the length equalizing circut 2, the multiplexer 41 is switched to receive the data from the address register 71, while when the multiplexer 41 receives the data D3 from the length equalizing circuit 2, the multiplexer 41 is switched to receive data from the address memory 3 of the FIFO type.

When the multiplexer 41 is switched to receive the data from the address register 71, the data from the address register 71 is supplied to and stored in the register 52 through the multiplexer 41. The stored data in the register 71 is cleared at the beginning of the operation and each time the decoding of data for one scan line is completed. In the circuit 63 for addition/subtraction, addition/subtraction between the data of the registers 52 and 53 is effected. The result of such addition/subtraction, which represents the address of the color change element on the current scan line, is supplied to and stored in the address register 71. The data in the address register 71 is written in the address memory 3 of the FIFO type under the control of the address writing-in circuit 62. Simultaneously the data in the address register 71 is supplied to the picture elements restoring circuit 72. The data in the picture elements restoring circuit 72 is written in the memory 75 for the data of picture elements of the current scan line, while the address counting circuit 74 counts the signals from the picture elements restoring circuit 72. The writing-in of data into the memory 75 is continued until the content of the register 71 becomes equal to the content of the address counting circuit 74.

After the above described process, when the multiplexer 41 receives the data D3 from the length equalizing circuit 2, the flip-flop circuit 42 changes its state and the address of the color change element which has already been decoded is read-out from the address memory 3 of the FIFO type. This address represents the distance between the start element for the scan line and the color change element. This reading-out of the address of the color change element is effected by a shift out signal SO supplied from the address reading-out circuit 61. This read-out address corresponds to the already decoded color change element on the preceding scan line.

This read-out address is supplied to and stored in the register 52. The data D1 which represents the distance between the color change point in question and the reference color change element is supplied to and stored in the register 53. In the addition/subtraction circuit 63, addition/subtraction between the data of the registers 52 and 53 is effected when the AND gate 45 produces a signal "1".

The AND gate 45 produces a signal "1" under the following conditions. Firstly, as the result of the comparison by the comparator 51 in which the data of the address register 71 which represents the address of the adjacent preceding color change element and the data of the register 52 which represents the address of the color change element on the preceding scan line are compared, it must be determined that the value of the data in the register 52 is greater than the value of the data in the register 71. Secondly, the address coincidence between the output signal of the flip-flop circuit 42, which represents discrimination between black and white of the color change element in question, and the output signal of the flip-flop circuit 43, which represents discrimination between black and white of the color change element on the preceding scan line, must be detected by the coincidence circuit 44. If these first and second conditions are not realized, the address of the next color change element on the preceding scan line is read out from the address memory 3 of the FIFO type and is supplied to the register 52 where the check is again effected as to whether or not these first and second conditions are realized. Such checks are repeated until these first and second conditions are realized.

When these first and second conditions are realized, the AND gate 45 supplies an output signal "1" to the address reading-out circuit 61. Upon receipt of this signal "1" from the AND gate 45, the determination of the order of the color change elements on the preceding scan line is effected in the address reading-out circuit 61 using the data D3 supplied from the circuit 2. If the order of a color change element on the preceding scan line is determined as No. 1, addition/subtraction of the data in the registers 52 and 53 is immediately effected in the addition/subtraction circuit 63. While, if the order of a color change element on the preceding scan line is determined as one of Nos. 2, 3, ..., n, the shift out signal SO, the number of which is one of 2, 4, ..., $2(n-1)$ corresponding to the above mentioned order Nos. 2, 3, ..., n, is supplied to the address memory 3 of the FIFO type from the address reading-out circuit 61, so that the address of a color change element the order of which is advanced by 2, 4, ..., $2(n-1)$ from the first color change element, corresponding to the above mentioned order Nos. 2, 3, ..., n, is read out from the address memory 3 of the FIFO type and is stored in the registered 52.

The result of addition/subtraction effected in the addition/subtraction circuit 63 is supplied to and stored in the address register 71. The data of the address register 71 is supplied to the picture elements restoring circuit 72 and the address memory 3 of the FIFO type. Thus, the decoded address of the color change element in question is written into the address memory 3 of the FIFO type.

Figures 4, 5:
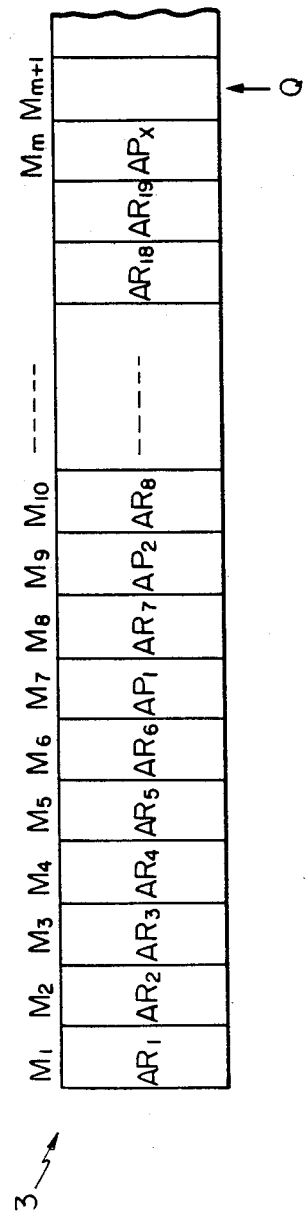
FIG. 4 illustrates a pattern of picture elements along a scan line used for the system of FIG. 3.
FIG. 5 illustrates a pattern of data stored in memory of a FIFO type used in the system of FIG. 3.

An example of the operation of the system of FIG. 3 will now be described with reference to FIG. 4 illustrating a pattern of the picture elements along the scan line and FIG. 5 illustrating a pattern of the data stored in the address memory 3 of the FIFO type. Addresses $AR_1$, $AR_2$, ..., $AR_6$, $AP_1$, $AR_7$, ..., $AR_{19}$ and $AP_X$ of color change elements $R_1$, $R_2$, ..., $R_6$, $P_1$, $R_7$, ..., $R_{19}$ and $P_X$ are stored in word sections $M_1$, $M_2$, ..., $M_m$, respectively, of the address memory 3 of the FIFO type. At first, the comparison between the address $AR_1$ and the address $AP_X$ and the comparison between the color data of the color change elements Q in question are $R_1$ and effected. Although the color (black) of the color change element Q in question is the same as the color of the color change element $R_1$, the color change elements $R_1$ and Q are located in a different direction with respect to the adjacent preceding color change element $P_X$, so that only the above mentioned second condition is realized and the above mentioned first condition is not realized at the color change element $R_1$. Hence, the second step comparison between the addresses $AR_2$ and the address $AP_X$ and comparison between the color data of the color change elements Q in question and $R_2$ is effected. In this step neither of the above mentioned first and second conditions is realized. Thus, the comparison proceeds to the third step in which the comparison regarding the color change element $R_3$ is effected. In this step, again, only the above mentioned second condition is realized and the above mentioned first condition is not realized. In such a manner, the comparison proceeds successively for the color change elements $R_4$ and $R_5$ and so on until both of the above mentioned first and second conditions are realized at the color change element $P_1$.

As illustrated in FIG. 4, both color change elements $P_1$ and $P_2$ on the preceding scan line realize the above mentioned first and second conditions. However, only the color change element $P_2$ should be selected as the reference color change element for the color change element Q in question. It should be noted that the information for this selection of the color change element $P_2$ is stored in the compressed data memory 1. In accordance with this information, the selection of the color change element $P_2$ as the reference color change element is carried out. From the address $AP_2$ of the reference color change element $P_2$ and the data for the distance between the element $P_2$ and the element Q, the address of the color change element Q in question is obtained as a result of the addition "$AP_2+(-1)$". It should be noted that since the element Q is located to the left of the element $P_2$, the distance is expressed as a minus value "$-1$", and accordingly, the above mentioned addition is substantially the subtraction "$AP_2-1$". The thus obtained address of the color change element Q in question is caused to be stored in the word section $M_{m+1}$.

Although in the above described embodiment of the present invention, the system of relative address coding is used, other embodiments of the present invention in which the system of edge difference coding (EDIC) type or relative element address designating coding (READ) is used are possible.

Figure 6:
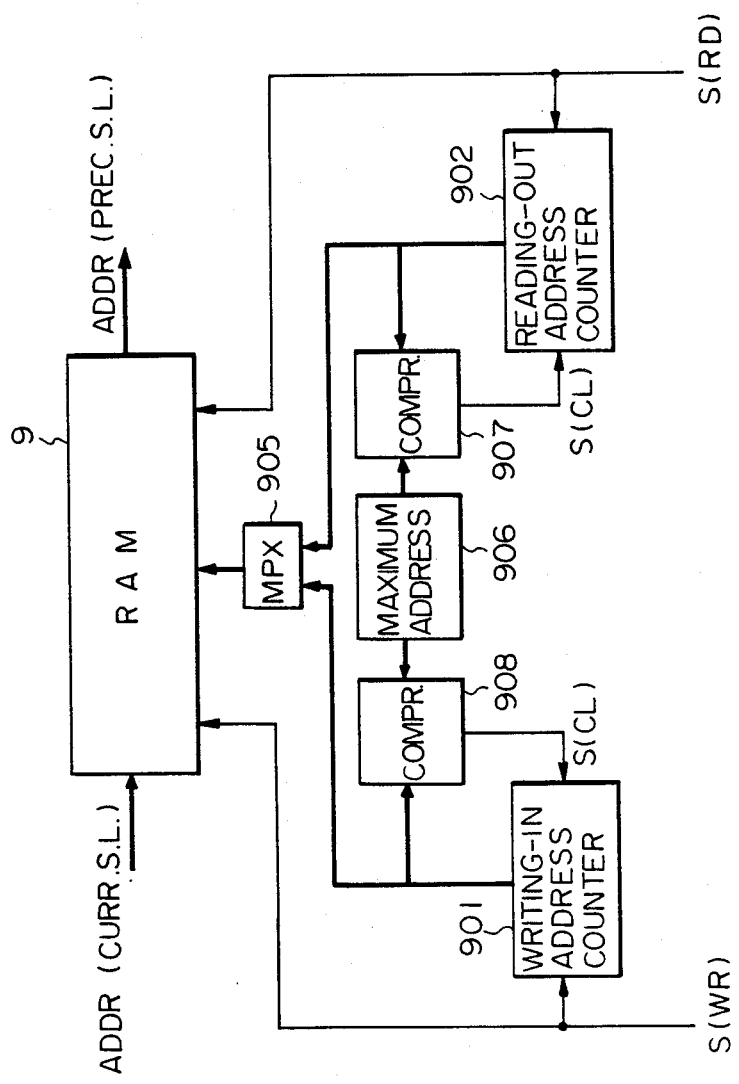
FIGS. 6 and 7 illustrate alternate embodiments of an address memory which can be used in the system of FIG. 3.
Figure 7:
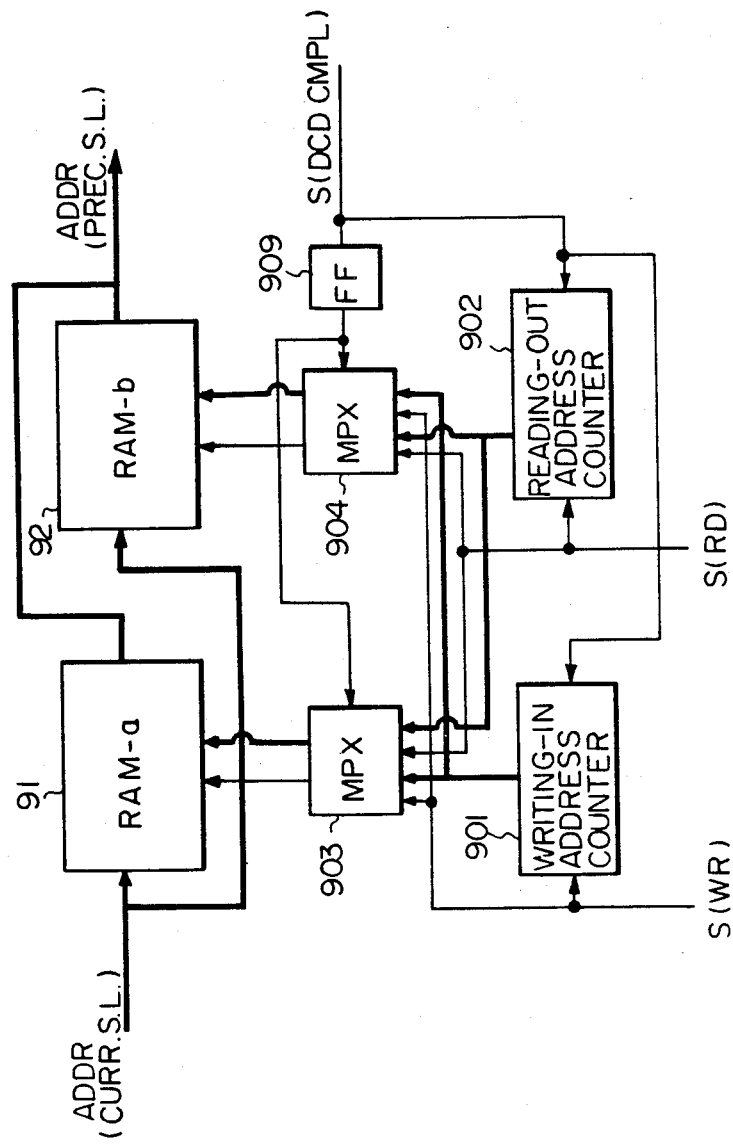

Also, although in the above described embodiment of the present invention, the address memory 3 of the FIFO type is used, memories of other types, such as random access memories (RAM) can be used. Such random access memories are illustrated in FIGS. 6 and 7. The device of FIG. 6 comprises a RAM 9, an address counter 901 for writing-in, an address counter 902 for reading-out, a multiplexer 905, a register 906 for a maximum address, and comparators 907 and 908. Addresses of color change elements on the current scan line are written-in to the RAM 9 and addresses of color change elements on the preceding scan line are read-out from the RAM 9. A writing-in signal S(WR) and a reading-out signal S(RD) are applied to the address counters 901 and 902, respectively. The signals S(WR) and S(RD) are also applied to the RAM 9. Clear signals S(CL) are applied to the address counters 901 and 902, respectively. When the data of the address counters 901 and 902 become greater than the data of a register 906 for the maximum address, the data of the address counters 901 and 902 are cleared by the clear signals S(CL) produced in the comparators 907 and 908. The device of FIG. 7 comprises a RAM-a 91 and a RAM-b 92, an address counter 901 for writing-in, an address counter 902 for reading-out, multiplexers 903 and 904, and a flip-flop circuit 909. Addresses of color change elements on the current scan line are written-in to the RAMs 91 and 92, and addresses of color change elements on the preceding scan line are read-out from the RAMs 91 and 92. A writing-in signal S(WR) is applied to the address counter 901 and the multiplexers 903 and 904. A reading-out signal S(RD) is applied to the address counter 902 and the multiplexers 903 and 904 each time the decoding of one scan line is completed. The output signal of the flip-flop circuit 909 is applied to the multiplexers 903 and 904, so that the switching between the read/write operations of the RAMs 91 and 92 is carried out. In the devices of FIGS. 6 and 7, the reading-out of data from the RAMs is carried out immediately after the writing-in of data into the RAMs, without a delay which occurs in the device of FIG. 3 due to the transmission between the input terminal and the output terminal of the address memory 3 of the FIFO type. Accordingly, the speed of operation of the devices of FIGS. 6 or 7 can be increased over that of the device of FIG. 3.

We claim:

1. A system for decoding compressed data, operatively connectable to a length equalizing circuit to receive therefrom data for independent and correlated elements and relative distance data therefrom, comprising:
    a memory for storing reference data for a reference element;
    a first register, operatively connected to said memory, for storing and passing therethrough the reference data;
    a second register, operatively connectable to the length equalizing circuit, for storing and passing therethrough the relative distance data;
    an addition/subtraction circuit, operatively connected to said first and second registers, for generating an address of a needed element in dependence upon the reference element data and the relative distance data;
    a third register, operatively connected to said addition/subtraction circuit and said memory, for storing and passing therethrough the address of the needed element;
    a multiplexer, operatively connected to said memory, said first register and said third register, and operatively connectable to the length equalizing circuit, for multiplexing between said memory and said third register in dependence upon the data for the independent and correlated elements;
    a comparator, operatively connected to said third register and said first register, for generating a greater than signal in dependence upon the reference data and the address of the needed element;
    a coincidence circuit, operatively connectable to the length equalizing circuit to receive the data for the independent and correlated elements, for generating a coincidence signal;
    an AND circuit, operatively connected to said coincidence circuit and said comparator, for generating an output signal in dependence upon the coincidence signal and the greater than signal;
    an address reading-out circuit, operatively connected to said coincidence circuit, said AND circuit and said memory, and operatively connectable to the length equalizing circuit, for controlling the reading out of the data concerning color change elements from said memory in dependence upon the output signal and the data for the independent and correlated elements and for generating data for a preceding element, said coincidence signal being generated in dependence upon the data for the independent and correlated elements and the data for the preceding element; and
    an address writing-in circuit, operatively connected to said memory and operatively connectable to the length equalizing circuit, for controlling the writing of data concerning color change elements into said memory in dependence upon the data for the independent element.

2. A system as defined in claim 1, wherein said memory is a FIFO type memory.

3. A system as defined in claim 1, wherein said memory is a RAM type memory.

UNITED STATES PATENT AND TRADEMARK OFFICE
CERTIFICATE OF CORRECTION

PATENT NO. : 4,492,983

DATED : January 8, 1985

INVENTOR(S) : Yoshida et al.

It is certified that error appears in the above-identified patent and that said Letters Patent is hereby corrected as shown below:

Column 3, line 45, "SUMMARY" should be --SUMMARY OF THE INVENTION--.

Column 4, line 67, "circut" should be --circuit--;

line 67, "2." should be --2,--.

Column 6, line 28, "tered" should be --ter--.

Signed and Sealed this

Seventeenth Day of November, 1987

Attest:

DONALD J. QUIGG

*Attesting Officer*  *Commissioner of Patents and Trademarks*